US012792770B2

(12) United States Patent
Du et al.

(10) Patent No.: US 12,792,770 B2
(45) Date of Patent: Nov. 10, 2026

(54) DIFFERENTIAL PRIVACY-BASED FEATURE PROCESSING METHOD AND APPARATUS

(71) Applicant: Alipay (Hangzhou) Information Technology Co., Ltd., Hangzhou (CN)

(72) Inventors: Jian Du, Hangzhou (CN); Pu Duan, Hangzhou (CN); Benyu Zhang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 314 days.

(21) Appl. No.: 18/394,978

(22) Filed: Dec. 22, 2023

(65) Prior Publication Data

US 2024/0152643 A1 May 9, 2024

Related U.S. Application Data

(63) Continuation of application No. PCT/CN2022/105052, filed on Jul. 12, 2022.

(30) Foreign Application Priority Data

Sep. 27, 2021 (CN) .......................... 202111133642.5

(51) Int. Cl.

| | |
|---|---|
| ***G06F 21/62*** | (2013.01) |
| ***G06F 21/60*** | (2013.01) |
| ***G06N 20/20*** | (2019.01) |

(52) U.S. Cl.

CPC ........ *G06F 21/6245* (2013.01); *G06F 21/602* (2013.01); *G06N 20/20* (2019.01)

(58) Field of Classification Search

CPC .... G06F 21/6245; G06F 21/602; G06N 20/20

See application file for complete search history.

(56) References Cited

U.S. PATENT DOCUMENTS 8,904,181 B1 * 12/2014 Felsher ................. H04L 9/0841 380/282

10,223,547 B2 3/2019 Rane et al.

(Continued)

FOREIGN PATENT DOCUMENTS

CN 110209994 A * 9/2019 ........... G06F 16/953

CN 110990857 A 4/2020

(Continued)

*Primary Examiner* — Shahriar Zarrineh

*Assistant Examiner* — Tommy Martinez

(74) *Attorney, Agent, or Firm* — Seed Intellectual Property Law Group LLP

(57) ABSTRACT

A first party stores a first feature portion of a plurality of samples, and a second party stores a plurality of binary classification labels corresponding to the plurality of samples. The second party separately encrypts the plurality of binary classification labels corresponding to the plurality of samples, to obtain a plurality of encrypted labels. The first party determines, based on the plurality of encrypted labels and a differential privacy noise, a positive sample encrypted noise addition quantity and a negative sample encrypted noise addition quantity corresponding to each bin in a plurality of bins. The second party decrypts the positive sample encrypted noise addition quantity and the negative sample encrypted noise addition quantity, to obtain a positive sample noise addition quantity and a negative sample noise addition quantity, so as to determine a noise addition index of a corresponding bin.

20 Claims, 4 Drawing Sheets

(56) References Cited

U.S. PATENT DOCUMENTS

| | | | | |
|---|---|---|---|---|
| 2018/0101697 | A1* | 4/2018 | Rane | H04L 9/085 |
| 2021/0334808 | A1* | 10/2021 | Ebrahimi | G06Q 20/4014 |
| 2023/0267216 | A1* | 8/2023 | Santana De Oliveira | G06F 21/60 726/26 |
| 2025/0036803 | A1* | 1/2025 | Carr | G06F 21/602 |
| 2025/0373420 | A1 | 12/2025 | Kii | |

FOREIGN PATENT DOCUMENTS

| | | | | |
|---|---|---|---|---|
| CN | 112163896 | A | 1/2021 | |
| CN | 112199702 | A | 1/2021 | |
| CN | 112749749 | A | 5/2021 | |
| CN | 113362048 | A | 9/2021 | |
| CN | 111400754 | B | 10/2021 | |
| CN | 113362048 | B | * 11/2021 | H04L 9/008 |
| CN | 113591133 | A | 11/2021 | |
| CN | 113591133 | B | 12/2021 | |
| CN | 114139450 | A | 3/2022 | |
| CN | 114154202 | B | 6/2022 | |
| CN | 114401079 | B | 6/2022 | |
| CN | 115329898 | B | 1/2023 | |
| CN | 115809473 | B | 4/2023 | |
| CN | 115913543 | A | 4/2023 | |
| CN | 114329127 | B | 6/2023 | |
| CN | 114398671 | B | 7/2023 | |
| CN | 116451275 | B | 8/2023 | |
| CN | 120658484 | A | 9/2025 | |
| WO | 2021179839 | A1 | 9/2021 | |

* cited by examiner

DIFFERENTIAL PRIVACY-BASED FEATURE PROCESSING METHOD AND APPARATUS

TECHNICAL FIELD

One or more implementations of this specification relate to the field of data processing technologies, and in particular, to a differential privacy-based feature processing method and apparatus.

BACKGROUND

In most industries, due to problems such as industry competition and privacy security, data usually exists in a form of an isolated island. Even if data of different departments of the same entity is centrally integrated, such integration is heavily hindered.

A Federated learning technology is provided, to make it possible to break the data island. Federal learning, also referred to as Federal machine learning, alliance learning, etc., is a machine learning framework, and aims to effectively help a plurality of parties to model data use and machine learning in response to that data privacy protection and legal compliance requirements are satisfied. Based on distributions of data between the plurality of parties, Federated learning can be divided into horizontal Federated learning, vertical Federated learning, etc. The vertical Federated learning is also referred to as sample-aligned Federated learning. As shown in FIG. 1, the plurality of parties have different sample features of the same sample ID, and a certain party (e.g., party B shown in FIG. 1) has a sample label.

In a scenario such as vertical Federated learning, in response to that a certain data party performs feature processing such as selection on sample feature data, a sample label held by another data party is to be used.

SUMMARY

In a technical solution of the specification, processing of feature data of one party can be completed based on sample label information of another party, without data privacy of either party being compromised. One or more implementations of this specification describe a differential privacy-based feature processing method and apparatus. A differential privacy mechanism, a data encryption algorithm, etc. are introduced, so that each data holder can jointly complete feature transformation processing while ensuring data security of the data holder.

According to an aspect, a differential privacy-based feature processing method is provided. The method relates to a first party and a second party, the first party stores a first feature portion of a plurality of samples, the second party stores a plurality of binary classification labels corresponding to the plurality of samples, and the method is performed by the second party, and includes: separately encrypting the plurality of binary classification labels corresponding to the plurality of samples, to obtain a plurality of encrypted labels; sending the plurality of encrypted labels to the first party; receiving, from the first party, a first positive sample encrypted noise addition quantity and a first negative sample encrypted noise addition quantity corresponding to each first bin in a plurality of first bins, and decrypting the first positive sample encrypted noise addition quantity and the first negative sample encrypted noise addition quantity, to obtain a corresponding first positive sample noise addition quantity of the first bin and a corresponding first negative sample noise addition quantity of the first bin, where the first positive sample encrypted noise addition quantity and the first negative sample encrypted noise addition quantity are determined based on the plurality of encrypted labels and a first differential privacy noise, and the plurality of first bins are obtained by performing binning processing on the plurality of samples for a feature in the first feature portion; and determining a first noise addition index of the first bin based on the first positive sample noise addition quantity of the first bin and the first negative sample noise addition quantity of the first bin.

In an implementation, a service object of the plurality of samples is any one or more of the following: a user, a commodity, or a service event.

In an implementation, the separately encrypting the plurality of binary classification labels corresponding to the plurality of samples, to obtain the plurality of encrypted labels includes: separately encrypting the plurality of binary classification labels based on a homomorphic encryption algorithm, to obtain the plurality of encrypted labels.

In an implementation, the determining the first noise addition index of the first bin based on the first positive sample noise addition quantity of the first bin and the first negative sample noise addition quantity of the first bin includes: performing summation processing on a plurality of first positive sample noise quantities corresponding to the plurality of first bins, to obtain a total first positive sample noise addition quantity; performing summation processing on a plurality of first negative sample noise quantities corresponding to the plurality of first bins, to obtain a total first negative sample noise addition quantity; and determining the first noise addition index of the first bin based on the total first positive sample noise addition quantity, the total first negative sample noise addition quantity, the first positive sample noise addition quantity of the first bin, and the first negative sample noise addition quantity of the first bin.

In an implementation, the first noise addition index of the first bin is a first noise addition weight of evidence, and the determining the first noise addition index of the first bin includes: dividing the first positive sample noise addition quantity of the first bin by the total first positive sample noise addition quantity, to obtain a first positive sample proportion; dividing the first negative sample noise addition quantity of the first bin by the total first negative sample noise addition quantity, to obtain a first negative sample proportion; and subtracting a logarithm result of the first negative sample proportion from a logarithm result of the first positive sample proportion, to obtain the first noise addition weight of evidence.

In an implementation, the second party further stores a second feature portion of the plurality of samples, and the method further includes: performing binning processing on the plurality of samples for a feature in the second feature portion, to obtain a plurality of second bins; determining a second noise addition index of each second bin in the plurality of second bins based on a differential privacy mechanism; and after the determining the first noise addition index of the first bin, the method further includes: performing feature selection processing on the first feature portion and the second feature portion based on the first noise addition index of the first bin and the second noise addition index.

In an implementation, the determining the second noise addition index of each second bin in the plurality of second bins based on a differential privacy mechanism includes: determining a real quantity of positive samples and a real quantity of negative samples in each second bin based on the binary classification label; separately adding a second differential privacy noise based on the real quantity of positive samples and the real quantity of negative samples, to correspondingly obtain a second positive sample noise addition quantity and a second negative sample noise addition quantity; and determining a corresponding second noise addition index of the second bin based on the second positive sample noise addition quantity and the second negative sample noise addition quantity.

In an implementation, the second differential privacy noise is a Gaussian noise, and before the separately adding the second differential privacy noise, the method further includes: determining a noise power based on a privacy budget parameter set for the plurality of samples and a quantity of bins corresponding to each feature in the second feature portion; generating a Gaussian noise distribution by using the noise power as a variance of a Gaussian distribution and using 0 as an average value; and sampling the Gaussian noise from the Gaussian noise distribution.

Further, in an example, the determining the noise power includes: determining a sum of quantities of bins corresponding to features in the second feature portion; obtaining a variable value of an average variable, where the variable value is determined based on a parameter value of the privacy budget parameter and a constraint relationship between the privacy budget parameter and the average variable in a Gaussian mechanism for differential privacy; and calculating the noise power based on a product of the following factors: the sum of the quantities of bins, and a reciprocal of a square operation performed on the variable value.

Further, in an example, the privacy budget parameter includes a budget item parameter and a relaxation item parameter.

In an implementation, the method further includes: correspondingly sampling a plurality of groups of noises from a noise distribution of differential privacy for the plurality of second bins; and the separately adding the second differential privacy noise includes: adding a noise in a corresponding group of noises based on the real quantity of positive samples, and adding another noise in the group of noises based on the real quantity of negative samples.

In an implementation, the determining the corresponding second noise addition index of the second bin based on the second positive sample noise addition quantity and the second negative sample noise addition quantity includes: performing summation processing on a plurality of second positive sample noise quantities corresponding to the plurality of second bins, to obtain a total second positive sample noise addition quantity; performing summation processing on a plurality of second negative sample noise quantities corresponding to the plurality of second bins, to obtain a total second negative sample noise addition quantity; and determining the second noise addition index based on the total second positive sample noise addition quantity, the total second negative sample noise addition quantity, the second positive sample noise addition quantity, and the second negative sample noise addition quantity.

Further, in an example, the second noise addition index is a second noise addition weight of evidence, and based on this, the determining the second noise addition index includes: dividing the second positive sample noise addition quantity by the total second positive sample noise addition quantity, to obtain a second positive sample proportion; dividing the second negative sample noise addition quantity by the total second negative sample noise addition quantity, to obtain a second negative sample proportion; and subtracting a logarithm result of the second negative sample proportion from a logarithm result of the second positive sample proportion, to obtain the second noise addition weight of evidence.

According to an aspect, a differential privacy-based feature processing method is provided. The method relates to a first party and a second party, the first party stores a first feature portion of a plurality of samples, the second party stores a second feature portion and a plurality of binary classification labels corresponding to the plurality of samples, and the method is performed by the first party, and includes: receiving a plurality of encrypted labels from the second party, where the plurality of encrypted labels are obtained by separately encrypting the plurality of binary classification labels corresponding to the plurality of samples; performing binning processing on the plurality of samples for a feature in the first feature portion, to obtain a plurality of first bins; determining, based on the plurality of encrypted labels and a differential privacy noise, a first positive sample encrypted noise addition quantity and a first negative sample encrypted noise addition quantity corresponding to each first bin; and sending the first positive sample encrypted noise addition quantity and the first negative sample encrypted noise addition quantity to the second party, for the second party to decrypt the first positive sample encrypted noise addition quantity and the first negative sample encrypted noise addition quantity to obtain a first positive sample noise addition quantity of the first bin and a first negative sample noise addition quantity of the first bin, and to determine a first noise addition index of the first bin based on the first positive sample noise addition quantity and the first negative sample noise addition quantity.

In an implementation, a service object of the plurality of samples is any one or more of the following: a user, a commodity, or a service event.

In an implementation, the determining, based on the plurality of encrypted labels and the differential privacy noise, the first positive sample encrypted noise addition quantity and the first negative sample encrypted noise addition quantity corresponding to each first bin includes: determining, for each first bin, a continued multiplication result between encrypted labels corresponding to all samples in the first bin; performing product processing on the continued multiplication result and an encrypted noise obtained by encrypting the differential privacy noise, to obtain the first positive sample encrypted noise addition quantity; and subtracting the first positive sample encrypted noise addition quantity from an encrypted total quantity obtained by encrypting a total quantity of samples in the first bin, to obtain the first negative sample encrypted noise addition quantity.

In an implementation, before the performing product processing on the continued multiplication result and the encrypted noise obtained by encrypting the differential privacy noise, to obtain the first positive sample encrypted noise addition quantity, the method further includes: correspondingly sampling a plurality of noises from a noise distribution of differential privacy for the plurality of first bins; and the performing product processing on the continued multiplication result and the encrypted noise obtained by encrypting the differential privacy noise includes: encrypting a noise corresponding to the continued multiplication result in the plurality of noises, to obtain the encrypted noise; and performing product processing on the continued multiplication result and the encrypted noise.

In an implementation, the differential privacy noise is a Gaussian noise, and before the determining, based on the plurality of encrypted labels and the differential privacy noise, the first positive sample encrypted noise addition quantity and the first negative sample encrypted noise addition quantity corresponding to each first bin, the method further includes: determining a noise power based on a privacy budget parameter set for the plurality of samples and a quantity of bins corresponding to each feature in the first feature portion; generating a Gaussian noise distribution by using the noise power as a variance of a Gaussian distribution and using 0 as an average value; and sampling the Gaussian noise from the Gaussian noise distribution.

In an implementation, the determining the noise power includes: determining a sum of quantities of bins corresponding to features in the second feature portion; obtaining a variable value of an average variable, where the variable value is determined based on a parameter value of the privacy budget parameter and a constraint relationship between the privacy budget parameter and the average variable in a Gaussian mechanism for differential privacy; and calculating the noise power based on a product of the following factors: the sum of the quantities of bins, and a reciprocal of a square operation performed on the variable value.

In an example, the privacy budget parameter includes a budget item parameter and a relaxation item parameter.

According to an aspect, a differential privacy-based feature processing apparatus is provided. The feature processing relates to a first party and a second party, the first party stores a first feature portion of a plurality of samples, the second party stores a plurality of binary classification labels corresponding to the plurality of samples, and the apparatus is integrated into the second party, and includes: a label encryption unit, configured to separately encrypt the plurality of binary classification labels corresponding to the plurality of samples, to obtain a plurality of encrypted labels; an encrypted label sending unit, configured to send the plurality of encrypted labels to the first party; an encrypted quantity processing unit, configured to: receive, from the first party, a first positive sample encrypted noise addition quantity and a first negative sample encrypted noise addition quantity corresponding to each first bin in a plurality of first bins, and decrypt the first positive sample encrypted noise addition quantity and the first negative sample encrypted noise addition quantity, to obtain a corresponding first positive sample noise addition quantity of the first bin and a corresponding first negative sample noise addition quantity of the first bin, where the first positive sample encrypted noise addition quantity and the first negative sample encrypted noise addition quantity are determined based on the plurality of encrypted labels and a first differential privacy noise, and the plurality of first bins are obtained by performing binning processing on the plurality of samples for a feature in the first feature portion; and a first index calculation unit, configured to determine a first noise addition index of the first bin based on the first positive sample noise addition quantity of the first bin and the first negative sample noise addition quantity of the first bin.

In an implementation, the second party further stores a second feature portion of the plurality of samples, and the apparatus further includes: a binning processing unit, configured to perform binning processing on the plurality of samples for a feature in the second feature portion, to obtain a plurality of second bins; a second index calculation unit, configured to determine a second noise addition index of each second bin in the plurality of second bins based on a differential privacy mechanism; and the apparatus further includes: a feature selection unit, configured to perform feature selection processing on the first feature portion and the second feature portion based on the first noise addition index of the first bin and the second noise addition index.

According to an aspect, a differential privacy-based feature processing apparatus is provided. The feature processing relates to a first party and a second party, the first party stores a first feature portion of a plurality of samples, the second party stores a plurality of binary classification labels corresponding to the plurality of samples, and the apparatus is integrated into the first party, and includes: an encrypted label receiving unit, configured to receive a plurality of encrypted labels from the second party, where the plurality of encrypted labels are obtained by separately encrypting the plurality of binary classification labels corresponding to the plurality of samples; a binning processing unit, configured to perform binning processing on the plurality of samples for a feature in the first feature portion, to obtain a plurality of first bins; an encrypted noise addition unit, configured to determine, based on the plurality of encrypted labels and a differential privacy noise, a first positive sample encrypted noise addition quantity and a first negative sample encrypted noise addition quantity corresponding to each first bin; and an encrypted quantity sending unit, configured to send the first positive sample encrypted noise addition quantity and the first negative sample encrypted noise addition quantity to the second party, for the second party to decrypt the first positive sample encrypted noise addition quantity and the first negative sample encrypted noise addition quantity to obtain a first positive sample noise addition quantity of the first bin and a first negative sample noise addition quantity of the first bin, and to determine a first noise addition index of the first bin based on the first positive sample noise addition quantity and the first negative sample noise addition quantity.

According to an aspect, a computer-readable storage medium is provided. The computer-readable storage medium stores a computer program, and in response to that the computer program is executed in a computer, the computer is enabled to perform the method provided in the first aspect or the second aspect.

According to an aspect, a computing device is provided, including a memory and a processor. The memory stores executable code, and in response to that the processor executes the executable code, the method provided in the first aspect or the second aspect is implemented.

According to the method and the apparatus provided in the implementations of this specification, differential privacy mechanisms and data encryption algorithm, etc., are introduced, so that each data holder can jointly complete feature transformation processing while ensuring data security of the data holder.

BRIEF DESCRIPTION OF DRAWINGS

To describe the technical solutions in the implementations of the present invention more clearly, the following briefly introduces the accompanying drawings required for describing the implementations. Clearly, the accompanying drawings in the description herein are merely some implementations of the present invention, and a person of ordinary skill in the field can still derive other drawings from these accompanying drawings without creative efforts.

DESCRIPTION OF EMBODIMENTS

The following describes the solutions provided in this specification with reference to the accompanying drawings.

As described herein, in response to that a data party performs feature processing on sample feature data, a sample label sometimes needs to be used. In a typical scenario, evaluation indexes such as a weight of evidence (weight of evidence, WoE) and an information value (Information Value, IV) of a sample feature can be calculated based on a sample label, thereby implementing feature selection and feature coding, providing a related data query service, etc. For example, to calculate a WoE of a sample feature i, samples are divided into bins based on a feature value distribution of the feature i, and then a WoE of each bin is calculated. For simplicity and clarity, a WoE value of the $j^{th}$ bin of the $i^{th}$ sample feature, or simply referred to as a feature bin, is calculated based on the following formula:

$$WoE_{i,j} = \ln\left(\frac{y_{i,j}}{y}\right) - \ln\left(\frac{n_{i,j}}{n}\right) \quad (1)$$

In Formula (1), $WoE_{i,j}$ represents a weight of evidence of a feature bin, $y_{i,j}$ and $n_{i,j}$ respectively represent a quantity of positive samples and a quantity of negative samples in the feature bin, and y and n respectively represent a quantity of positive samples and a quantity of negative samples in a total set of samples.

It can be learned from the descriptions herein that, in a process of calculating the WoE, values of $y_{i,j}$, $n_{i,j}$, y, and n are to be determined based on a sample label indicating whether each sample is a positive sample or a negative sample. However, in scenarios such as vertical Federated learning, some data parties hold only sample feature data, but do not hold a sample label.

Figure 1:
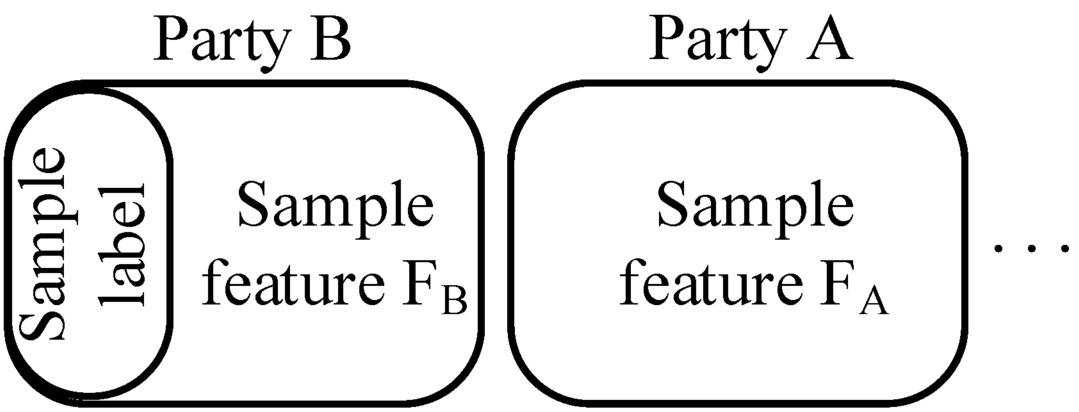
FIG. 1 (Related Art)
FIG. 1 is a diagram illustrating a data distribution scenario of vertical Federated learning according to an implementation.
Figure 2:
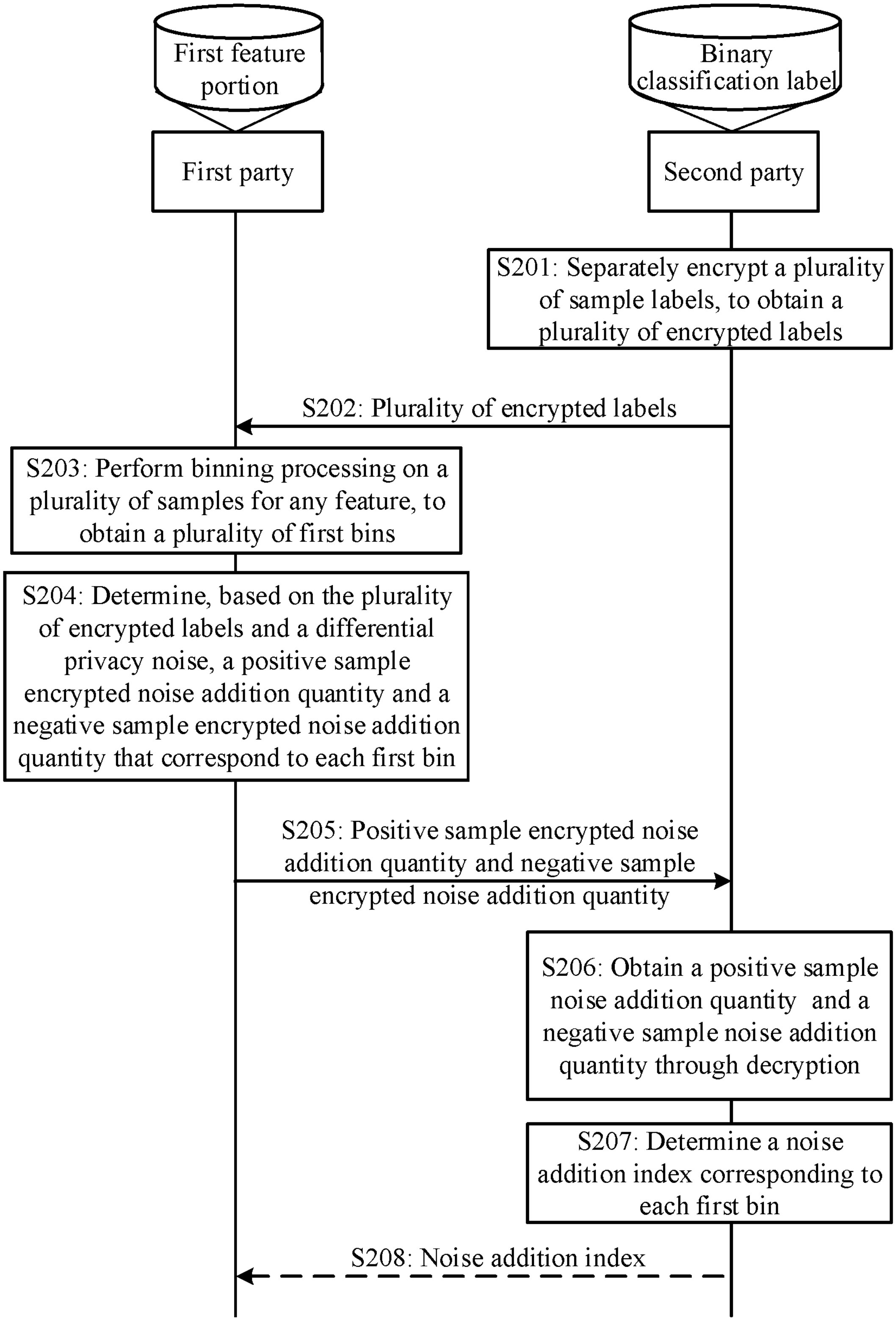
FIG. 2 is a diagram illustrating multi-party interaction of differential privacy-based feature processing according to an implementation.

An implementation of this specification discloses a solution, so that a data party that has no sample label can calculate a feature evaluation index such as a WoE of feature data of the data party based on sample label information in a label holder without data privacy of either party being compromised. For example, FIG. 2 is a diagram illustrating multi-party interaction of differential privacy-based feature processing according to an implementation. It should be noted that a plurality of parties include at least two parties. For descriptive purposes only, in this specification, a party that holds a sample label is referred to as a second party, any other party that does not store a sample label but holds sample feature data is referred to as a first party, and some features of a sample that are held by the first party is referred to as a first feature portion. It should be understood that, in FIG. 2, only an interaction process between the second party and a certain first party is shown, and both the first party and the second party can be implemented as any apparatus, platform, device cluster, etc. that has a computing and processing capability.

As shown in FIG. 2, the interaction process includes the following steps.

Step S201: The second party separately encrypts the plurality of binary classification labels corresponding to a plurality of samples, to obtain a plurality of encrypted labels. It should be noted that, a service object of the plurality of samples can be a user, a commodity, or a service event. A binary classification label (or referred to as a "class label of binary classification") can include a risk class label, an abnormality level label, etc. In an example, the service object is an individual user. Correspondingly, a binary classification label corresponding to an individual user sample can include a high consumption population and a low consumption population, or can be a low-risk user or a high-risk user. In another example, the service object is an enterprise user. Correspondingly, a binary classification label corresponding to an enterprise user sample can include a credit enterprise and a dishonest enterprise. In still another example, the service object is a commodity. Correspondingly, a binary classification label corresponding to a commodity sample can include a hot commodity and a cold commodity. In yet another example, the service object is a service event, for example, a registration event, an access event, a login event, or a payment event. Correspondingly, a binary classification label corresponding to an event sample can include an abnormal event and a normal event.

In an implementation, the step can include: separately encrypting the plurality of binary classification labels based on a homomorphic encryption algorithm, to obtain the plurality of encrypted labels. In an implementation, the homomorphic encryption algorithm satisfies addition homomorphism. Further, in an example, the homomorphic encryption algorithm satisfies a condition: A decryption result obtained after ciphertexts are multiplied is equal to a value obtained by adding corresponding plaintexts. For example, the condition can be represented as follows:

$$Dec\left[\prod_i Enc(t_i)\right] = \sum_i t_i \quad (2)$$

In Formula (2), $t_1$ represents the $i^{th}$ plaintext, Enc( ) represents an encryption operation, and Dec( ) represents a decryption operation. It should be understood that two classification label values related to the binary classification labels are usually 0 and 1. Based on this, in a scenario disclosed in this implementation of this specification, the condition can be detailed as follows: a value obtained by decrypting a product result of a continued multiplication result $$\prod_{i=1}^{T} Enc(\ell_i)$$

between encrypted labels $Enc(\ell_i)$ corresponding to any quantity T of binary classification labels $\ell_i$ in the plurality of binary classification labels and an encrypted value $Enc(m_1)$ obtained by encrypting a certain first value $m_1$ is equal to a sum of the first value $m_1$ and a quantity $m_2$ of labels whose label values are 1 in T binary classification labels $\ell_i$. For example, the detailed condition can be represented as follows:

$$Dec\left[Enc(m_1)\prod_{i=1}^{T}Enc(\ell_i)\right] = m_1 + m_2 \tag{3}$$

$$m_2 = \sum_{i=1}^{T} I(\ell_i)$$

$$I(\ell_i) = \begin{cases} 1, & \ell_i = 1 \\ 0, & \ell_i = 0 \end{cases}$$

It should be noted that, in Formula (3), $$\prod_{i=1}^{T} Enc(\ell_i) = g^{m_2}.$$

Herein, g is a value designed in a determined encryption algorithm.

In an implementation, a condition satisfied by the determined encryption algorithm can be further as follows: A value obtained by decrypting a result obtained by performing a modulo operation based on a determined value n after multiplying ciphertexts is equal to a value obtained by adding corresponding plaintexts. Value n can be predetermined or dynamically determined. For example, the condition can be represented as follows:

$$Dec\left[\prod_i Enc(t_i) \bmod n\right] = \sum_i t_i \tag{4}$$

Based on the descriptions herein, the second party can obtain a plurality of encrypted labels Enc($\ell_i$) through encryption. It should be noted that, although there are only two types of values of binary classification labels, different random numbers can be obtained by encrypting the same label value for a plurality of times based on a non-deterministic (non-deterministic) encryption algorithm. Therefore, the obtained random number is used as a corresponding encrypted label, to ensure that another party cannot obtain a real label by performing decryption based on the encrypted label.

Then, in step S202, the first party receives the plurality of encrypted labels Enc($\ell_i$) from the second party. The first party can perform step S203 before, in response to that, or after performing step S202, to perform binning processing on the plurality of samples for a feature in the first feature portion held by the first party, to obtain a plurality of first bins.

For the first feature portion, in an implementation, the service object of the plurality of samples is an individual user. Correspondingly, the first feature portion can include at least one of the following individual user features: an age, a gender, an occupation, a usual place of residence, an income, a transaction frequency, a transaction amount, a transaction detail, etc. In another implementation, the service object of the plurality of samples is an enterprise user. Correspondingly, the first feature portion can include at least one of the following enterprise user features: an establishment time, an operation scope, recruitment information, etc. In still another implementation, the service object of the plurality of samples is a commodity. Correspondingly, the first feature portion can include one or more of the following commodity features: a cost, a name, a place of origin, a category, a sales volume, inventory, a gross profit, etc. In yet another implementation, the service object of the plurality of samples is a service event. Correspondingly, the first feature portion can include one or more of the following event features: an event occurrence moment, a network environment (e.g., an IP address), a geographical location, duration, etc.

For binning processing, simply, continuous variables are discretized, and discrete variables of a plurality of states are combined into a few states. There are a plurality of binning manners, including equal-frequency binning, equal-distance binning, clustering binning, best-KS binning, chi-square binning, etc.

For ease of understanding, equal-distance binning is used as an example for description. In an implementation, the step can include: for any first feature in the first feature portion, determining a plurality of equal-distance intervals that correspond to a plurality of bin classes based on value space of the first feature; and for any sample in the plurality of samples, determining that the sample corresponds to an equal-distance interval in which a feature value of the first feature is located, so that the sample is classified into a bin of a corresponding class. In an example, it is assumed that the first feature is an annual income, and a plurality of feature values of an annual income corresponding to a plurality of samples include 12, 20, 32, 45, 55, and 60 (unit: Ten Thousand). Based on this, equal-distance binning can be performed to obtain a binning result shown in Table 1.

TABLE 1

| Feature value | Equal-distance interval | Bin class | Sample ID |
|---|---|---|---|
| 12 | [10, 30) | Low income | 1, 3, 7, 8, . . . |
| 20 | | | |
| 32 | [30, 50) | Middle income | 2, 4, 9, 10, . . . |
| 45 | | | |
| 55 | [50, 70) | High income | 5, 6, 11, 12, . . . |

As shown in Table 1, the binning result includes sample IDs corresponding to each bin in a plurality of bins.

Based on the descriptions herein, the first party can obtain a plurality of first bins of any first feature through binning processing in step S203, and receive the plurality of encrypted labels Enc($\ell_i$) from the second party in step S202. Based on this, the first party can perform step S204, to determine, based on the plurality of encrypted labels Enc($\ell_i$) and a first differential privacy noise, a first positive sample encrypted noise addition quantity and a first negative sample encrypted noise addition quantity corresponding to each first bin in the plurality of first bins.

It should be noted that the first differential privacy noise is a noise sampled by the first party based on a differential privacy ("DP" for short) mechanism. In an implementation of a DP technology, a random noise is usually added to original data or an original data calculation result, so that data to which a noise is added is available, and original data privacy is effectively prevented from being disclosed due to disclosure of the data.

There are a plurality of DP mechanisms such as a Gaussian mechanism, a Laplacian mechanism, or an exponential mechanism. Correspondingly, the first differential privacy noise can be a Gaussian noise, a Laplacian noise, an exponential noise, etc. For ease of understanding, an example in which the first differential privacy noise is a Gaussian noise is used to describe a noise determining process.

The Gaussian noise is sampled from a Gaussian noise distribution of differential privacy, and a key parameter of the Gaussian noise distribution includes an average value and a variance. In an implementation, a noise power determined based on a differential privacy budget parameter is used as a variance of a Gaussian distribution and 0 is used as an average value, to generate the Gaussian noise distribution. For example, the first party can determine the noise power based on a privacy budget parameter that is set by the first party for the plurality of samples and a quantity of bins corresponding to each feature in the first feature portion held by the first party.

Further, in an implementation, the first party determines a sum of quantities of bins corresponding to features in the first feature portion. For example, a feature set corresponding to the first feature portion is denoted as $\mathcal{F}_A$, and a quantity of bins corresponding to the $i^{th}$ feature is denoted as so that the sum of the quantities of bins can be denoted as $\sum_{i=1}^{|\mathcal{F}_A|} K_i$.

In addition to determining the sum, the first party further solves a variable value of an average variable. The variable value is determined based on a parameter value of the privacy budget parameter and a constraint relationship between the privacy budget parameter and the average variable. The constraint relationship is existing in a Gaussian mechanism for differential privacy, and can be represented by the following formula:

$$\delta(\varepsilon;\mu)=\Phi\left(-\frac{\varepsilon}{\mu}+\frac{\mu}{2}\right)-e^{\varepsilon}\Phi\left(-\frac{\varepsilon}{\mu}-\frac{\mu}{2}\right) \tag{5}$$

In Formula (5), ε and δ respectively represent a budget item parameter and a relaxation item parameter in the privacy budget parameter, parameter values of the budget item parameter and the relaxation item parameter can be manually set by a worker based on an actual requirement, μ represents the average variable, Φ(t) represents a probability distribution function of a standard Gaussian distribution, $$\Phi(t)=\mathbb{P}[\mathcal{N}(0,1)\le t]=\frac{1}{\sqrt{2\pi}}\int_{-\infty}^{t}e^{-y^2/2}dy.$$

Further, the noise power can be calculated based on the determined sum of the quantities of bins and the variable value of the average variable. For example, the noise power can be calculated based on a product of the following factors: the sum of the quantities of bins and a reciprocal obtained after a square operation is performed on the variable value of the average variable. For example, the noise power can be calculated based on the following formula:

$$\sigma_A^2=\frac{2}{\mu_A^2}\sum_{i=1}^{|\mathcal{F}_A|}K_i \tag{6}$$

In Formula (6), a lower corner mark A represents that a variable corresponds to the first party, $$\sigma_A^2$$

and $\mu_A$ respectively represent the noise power and the variable value of the average variable, $\mathcal{F}_A$ represents the feature set corresponding to the first feature portion, $|\mathcal{F}_A|$ represents a quantity of feature elements in the set, and $K_i$ represents the quantity of bins corresponding to the $i^{th}$ feature.

Therefore, the first party can determine the noise power, to generate the Gaussian noise distribution $$\mathcal{N}(0,\sigma_A^2)$$

by using the noise power as the variance of the Gaussian distribution and using 0 as the average value, so that a Gaussian noise $z$, $$z\in\mathcal{N}(0,\sigma_A^2)$$

is randomly sampled from the Gaussian noise distribution $$\mathcal{N}(0,\sigma_A^2).$$

Determining of the noise distribution of differential privacy is described herein by mainly using the Gaussian noise as an example. In addition, for a sampling quantity of the first differential privacy noise, random noise sampling can be separately performed for different objects to which a noise is to be added. In an implementation, the first party can correspondingly sample a plurality of noises from the noise distribution of differential privacy for the plurality of first bins. For example, random sampling can be performed on the Gaussian noise distribution for a plurality of times, to obtain a plurality of Gaussian noises.

Based on the descriptions herein, the first differential privacy noise can be sampled, so that the first positive sample encrypted noise addition quantity and the first negative sample encrypted noise addition quantity corresponding to each first bin are determined with reference to the plurality of encrypted labels $\mathrm{Enc}(\ell_i)$.

In an implementation, the first positive sample encrypted noise addition quantity can be first determined. In an implementation, for each first bin, a continued multiplication result between encrypted labels corresponding to all samples in the first bin is determined, to perform product processing on the continued multiplication result and an encrypted noise obtained by encrypting the differential privacy noise, to obtain the first positive sample encrypted noise addition quantity. For example, such a calculation process can be represented as follows:

$$\mathrm{Enc}(\tilde{y}_{i,j})=\mathrm{Enc}(z_{i,j})\prod_{\ell_{i,k}\in\mathcal{B}_{i,j}}\mathrm{Enc}(\ell_{i,k}) \tag{7}$$

In Formula (7), a subscript 'i,j' 0 represents the $j^{th}$ bin of the $i^{th}$ feature, and corresponds to any certain first bin; $\mathrm{Enc}(\tilde{y}_{i,j})$ represents a first positive sample encrypted noise addition quantity corresponding to the certain first bin; $z_{i,j}$ represents a differential privacy noise corresponding to the certain first bin; $\mathrm{Enc}(z_{i,j})$ represents a corresponding encrypted noise; $\mathcal{B}_{i,j}$ represents a sample set corresponding to the certain first bin; $\ell_{i,k}\in\mathcal{B}_{i,j}$ represents a label of a sample in the set $\mathcal{B}_{i,j}$; $\mathrm{Enc}(\ell_{i,k})$ represents an encrypted label corresponding to a sample label $\ell_{i,k}$; and $\prod_{\ell_{i,k}\in\mathcal{B}_{i,j}}Enc(\ell_{i,k})$ represents the continued multiplication result between the encrypted labels.

In an implementation, a modulo operation can be further performed on a result obtained through product processing, to obtain the first positive sample encrypted noise addition quantity. For example, such a calculation process can be represented as follows:

$$Enc(\tilde{y}_{i,j}) = \left(Enc(z_{i,j})\left(\prod_{\ell_{i,k}\in\mathcal{B}_{i,j}} Enc(\ell_{i,k})\right) \bmod n \qquad (8)$$

In Formula (8), n represents the determined value.

Therefore, the first positive sample encrypted noise addition quantity corresponding to the first bin can be determined. Further, the first negative sample encrypted noise addition quantity corresponding to the first bin can be determined. For example, the first positive sample encrypted noise addition quantity is subtracted from an encrypted total quantity obtained by encrypting a total quantity of samples in the first bin based on the homomorphic encryption algorithm, to obtain the first negative sample encrypted noise addition quantity. For example, such a calculation process can be represented as follows:

$$Enc(\tilde{n}_{i,j}) = Enc(N_{i,j}) - Enc(\tilde{y}_{i,j}) \qquad (9)$$

In Formula (9), Enc(·) represents the homomorphic encryption algorithm, and satisfies addition homomorphism; $Enc(\tilde{n}_{i,j})$ represents a first negative sample encrypted noise addition quantity corresponding to a certain first bin; $N_{i,j}$ represents a total quantity of samples in the certain first bin; $Enc(N_{i,j})$ represents an encrypted total quantity obtained by encrypting the total quantity; and $Enc(\tilde{y}_{i,j})$ represents a first positive sample encrypted noise addition quantity corresponding to the certain first bin.

Therefore, the first positive sample encrypted noise addition quantity $Enc(\tilde{y}_{i,j})$ of the first bin can be determined, and then the first negative sample encrypted noise addition quantity $Enc(\tilde{n}_{i,j})$ of the first bin is determined. In fact, a calculation result of Formula (7) or Formula (8) can also be designed to correspond to the first negative sample encrypted noise addition quantity $Enc(\tilde{n}_{i,j})$. Further, based on a similar idea as that of Formula (9), $Enc(\tilde{n}_{i,j})$ is subtracted from the encrypted total quantity $Enc(N_{i,j})$, to obtain the first positive sample encrypted noise addition quantity $Enc(\tilde{y}_{i,j})$.

In addition, it should be noted that in an implementation, an encryption algorithm used in response to that the first party encrypts the differential privacy noise and the total quantity of samples in the bin is the same as an encryption algorithm used in response to that the second party encrypts the sample label.

Based on the descriptions herein, the first party can determine the first positive sample encrypted noise addition quantity $Enc(\tilde{y}_{i,j})$ and the first negative sample encrypted noise addition quantity $Enc(\tilde{n}_{i,j})$ that correspond to each first bin in the plurality of first bins of a feature in the first feature portion, to send the first positive sample encrypted noise addition quantity $Enc(\tilde{y}_{i,j})$ and the first negative sample encrypted noise addition quantity $Enc(\tilde{n}_{i,j})$ to the second party in step S205.

Then, the second party performs step S206, to decrypt the first positive sample encrypted noise addition quantity Enc $(\tilde{y}_{i,j})$ and the first negative sample encrypted noise addition quantity $Enc(\tilde{n}_{i,j})$ that correspond to each first bin, to obtain a corresponding first positive sample noise addition quantity $\tilde{y}_{i,j}$ of the first bin and a corresponding first negative sample noise addition quantity $\tilde{n}_{i,j}$ of the first bin.

In an implementation, it is assumed that the first positive sample encrypted noise addition quantity $Enc(\tilde{y}_{i,j})$ is calculated based on Formula (7), and an encryption algorithm used by the second party satisfies Formula (3). Based on this, decryption of $Enc(\tilde{y}_{i,j})$ can be correspondingly represented as follows:

$$\begin{aligned} Dec[Enc(\tilde{y}_{i,j})] &= Dec\left[Enc(z_{i,j})\prod_{\ell_{i,k}\in\mathcal{B}_{i,j}} Enc(\ell_{i,k})\right] \\ &= Dec[Enc(z_{i,j})g^{y_{i,j}}] \\ &= z_{i,j} + y_{i,j} \\ &= \tilde{y}_{i,j} \end{aligned} \qquad (10)$$

In addition, it is assumed that the first negative sample encrypted noise addition quantity $Enc(\tilde{n}_{i,j})$ is calculated based on Formula (9). In this case, the negative sample encrypted noise addition quantity $\tilde{n}_{i,j}$ can be obtained by decrypting $Enc(\tilde{n}_{i,j})$ based on homomorphism of the encryption algorithm.

It should be noted that a decryption manner corresponds to an encryption manner Examples are not exhaustively listed.

Therefore, the second party can obtain the first positive sample noise addition quantity $\tilde{y}_{i,j}$ of the first bin and the first negative sample noise addition quantity $\tilde{n}_{i,j}$ of the first bin through decryption. Further, the second party performs step S207, to determine a first noise addition index of the first bin based on the first positive sample noise addition quantity $\tilde{y}_{i,j}$ of the first bin and the first negative sample noise addition quantity $\tilde{n}_{i,j}$ of the first bin.

For example, summation processing is performed on a plurality of first positive sample noise quantities $\tilde{y}_{i,j}$ corresponding to a plurality of first bins of a certain first feature, to obtain a total first positive sample noise addition quantity $\tilde{y}_i$. For example, such summation processing can be represented as follows:

$$\tilde{y}_i = \sum_{j\in\mathcal{B}_{i,j}} \tilde{y}_{i,j} \qquad (11)$$

In addition, the total first positive sample noise addition quantity $\tilde{y}_i$ is subtracted from a total sample quantity $\mathcal{N}$ of the plurality of samples, to obtain the total first negative sample noise addition quantity $\tilde{n}_i$. For example, such a calculation process can be represented as follows:

$$\tilde{n}_i = \mathcal{N} - \tilde{y}_i \qquad (12)$$

Alternatively or additionally, summation processing is performed on a plurality of first negative sample noise quantities $\tilde{n}_{i,j}$ corresponding to the plurality of first bins, to obtain the total first negative sample noise addition quantity $\tilde{n}_i$. For example, such summation processing can be represented as follows:

$$\tilde{n}_i = \sum_{j \in \mathcal{B}_i} \tilde{n}_{i,j} \quad (13)$$

In Formula (13), $\mathcal{B}_i$ represents a set including a plurality of first bins in the $i^{th}$ feature.

Further, the first noise addition index of the first bin can be determined based on the obtained total first positive sample noise addition quantity $\tilde{y}_i$, the obtained total first negative sample noise addition quantity $\tilde{n}_i$, and a first positive sample noise addition quantity $\tilde{y}_{i,j}$ of the first bin and a first negative sample noise addition quantity $\tilde{n}_{i,j}$ of the first bin that correspond to any first bin.

In an implementation, the first noise addition index of the first bin is a first weight of evidence $\widetilde{\text{WoE}}_{i,j}$, and calculation of the first noise addition index of the first bin can include: dividing the first positive sample noise addition quantity $\tilde{y}_{i,j}$ of the first bin by the total first positive sample noise addition quantity $\tilde{y}_i$, to obtain a first positive sample proportion; dividing the first negative sample noise addition quantity $\tilde{n}_{i,j}$ of the first bin by the total first negative sample noise addition quantity $\tilde{n}_i$, to obtain a first negative sample proportion; and subtracting a logarithm result of the first negative sample proportion from a logarithm result of the first positive sample proportion, to obtain the first noise addition weight of evidence. For example, such a calculation process can be represented as follows:

$$\widetilde{\text{WoE}}_{i,j} = ln\left(\frac{\tilde{y}_{i,j}}{\tilde{y}_i}\right) - ln\left(\frac{\tilde{n}_{i,j}}{\tilde{n}_i}\right), \forall i \in \mathcal{F}_A, j \in \mathcal{B}_i \quad (14)$$

Therefore, the second party can determine a first noise addition weight of evidence $\widetilde{\text{WoE}}_{i,j}$ corresponding to any first bin. It can be understood that the first noise addition weight of evidence $\widetilde{\text{WoE}}_{i,j}$ is equivalent to a noise addition quantity obtained by adding the differential privacy noise $z_{i,j}$ to a corresponding original weight of evidence $\text{WoE}_{i,j}$.

In an implementation, the first noise addition index of the first bin is a first information value $\widetilde{\text{IV}}_{i,j}$, and calculation of the first noise addition index of the first bin can include: calculating the first positive sample proportion and the first negative sample proportion; calculating a difference between the first positive sample proportion and the first negative sample proportion; calculating a difference between the logarithm result of the first positive sample proportion and the logarithm result of the first negative sample proportion; and obtaining a product result between the two differences, and using the product result as the first information value $\widetilde{\text{IV}}_{i,j}$. For example, such a calculation process can be represented as follows:

$$\widetilde{\text{IV}}_{i,j} = \left(\frac{\tilde{y}_{i,j}}{\tilde{y}_i} - \frac{\tilde{n}_{i,j}}{\tilde{n}_i}\right) ln\left(\frac{\tilde{y}_{i,j}/\tilde{y}_i}{\tilde{n}_{i,j}/\tilde{n}_i}\right), \forall i \in \mathcal{F}_A, j \in \mathcal{B}_i \quad (15)$$

Therefore, the second party can determine a first information value $\widetilde{\text{IV}}_{i,j}$ corresponding to any first bin. It can be understood that the first information value $\widetilde{\text{IV}}_{i,j}$ is equivalent to a noise addition quantity obtained by adding the differential privacy noise $z_{i,j}$ to a corresponding original information value $\text{IV}_{i,j}$.

In the descriptions herein, in response to that data privacy of each party is protected, a feature evaluation index such as a weight of evidence of feature data of a first party that holds no sample label or an IV value is calculated based on sample label information held by the second party.

In an implementation of an aspect, after performing step S207, the second party can further perform step S208, to send the first noise addition index of the first bin to the first party. In this way, the first party can perform feature selection based on a noise addition index corresponding to each first bin of each first feature in the first feature portion held by the first party. For example, in response to that noise addition indexes corresponding to all first bins of a certain feature are very close to each other, it can be determined that the feature is a redundant feature, and the feature is discarded. Alternatively, feature coding can be performed. For example, for the plurality of samples, a feature value of any first feature corresponding to any sample can be coded as a noise addition index of a first bin that is the first feature and to which the sample belongs. Further, a code value of the feature can be used as an input of a machine learning model in Federated learning, to effectively avoid disclosing training data privacy in response to that a model parameter is disclosed or a model is open for use.

In an implementation of still another aspect, the second party can calculate, by using the differential privacy mechanism, a feature evaluation index for feature data held by the second party. For distinguishing of description, feature data held by the second party for the plurality of samples is referred to as a second feature portion. For descriptions of the second feature portion, references can be made to the descriptions of the first feature portion. It should be noted that, the first feature portion and the second feature portion correspond to different features of the same sample ID.

The second party calculates a second noise addition index of a second bin of a second feature rather than an original index. In an application scenario, feature selection of the second feature portion and the first feature portion can be implemented with reference to the second noise addition index and the first noise addition index of the first bin, to obtain a more precise feature selection result while protecting privacy of each party. In another application scenario, feature coding can alternatively be performed on the second feature portion based on the second noise addition index.

Figure 3:
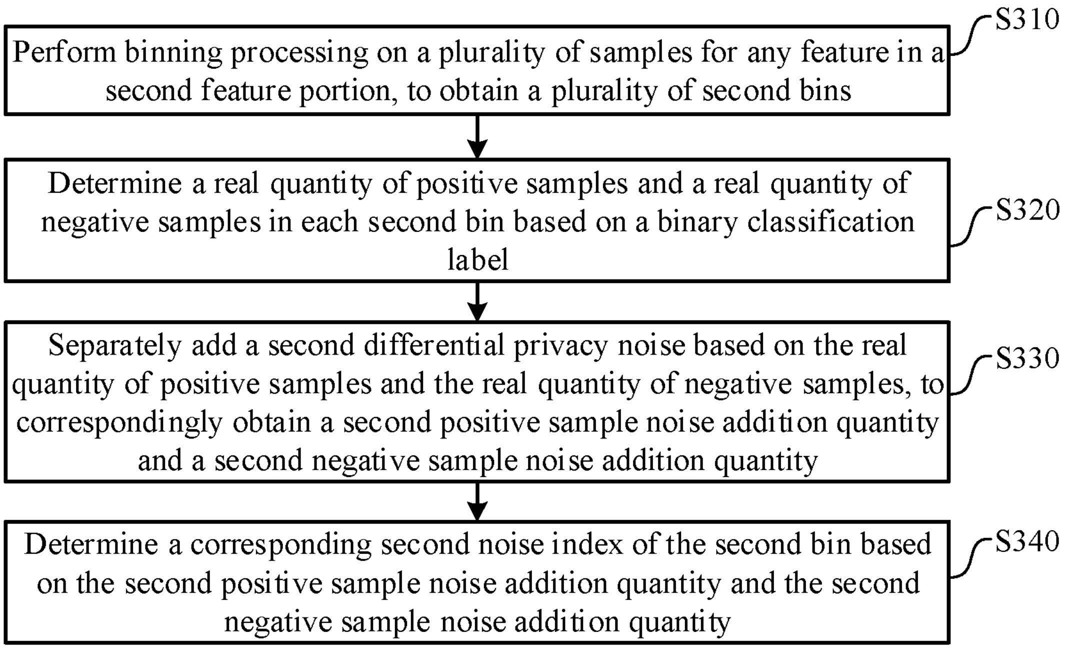
FIG. 3 is a flowchart illustrating a differential privacy-based feature processing method according to an implementation.

The following describes a process in which a second party calculates, by using a privacy differential privacy mechanism, feature evaluation indexes such as a WoE and an IV value based on a binary classification label and feature data that are held by the second party. FIG. 3 is a flowchart illustrating a differential privacy-based feature processing method according to an implementation. The method is performed by the second party. As shown in FIG. 3, the method can include the following steps.

Step S310: Perform binning processing on a plurality of samples for a feature in a second feature portion, to obtain a plurality of second bins. Step S320: Determine a real quantity of positive samples and a real quantity of negative samples in each second bin based on the binary classification label. Step S330: Separately add a second differential privacy noise based on the real quantity of positive samples and the real quantity of negative samples, to correspondingly obtain a second positive sample noise addition quantity and a second negative sample noise addition quantity. Step S340: Determine a corresponding second noise addition index of the second bin based on the second positive sample noise addition quantity and the second negative sample noise addition quantity.

The above-mentioned steps are described in detail as follows:

First, in step S310, binning processing is performed on the plurality of samples for any second feature in the second feature portion, to obtain a plurality of second bins. It should be noted that, each second bin can include a sample ID of a corresponding sample. In addition, for descriptions of the binning processing, references can be made to related descriptions in the above-mentioned implementations, and details are omitted herein for simplicity.

Then, in step S320, the real quantity of positive samples and the real quantity of negative samples in each second bin are determined based on the binary classification label. For example, for any second bin, a quantity of positive samples and a quantity of negative samples in the second bin can be counted based on a binary classification label corresponding to each sample in the second bin, and the counted quantities herein are real quantities.

In an example, a calculated sample distribution is shown in Table 2, and includes sample quantities corresponding to different label values in each second bin, that is, a low consumption population and a high consumption population.

TABLE 2

| Label value | Sample quantity | Bin class | Low income | Middle income | High income | Total |
|---|---|---|---|---|---|---|
| Low consumption population | | | 15 | 20 | 5 | 40 |
| High consumption population | | | 10 | 30 | 20 | 60 |
| Total | | | 25 | 50 | 25 | 100 |

Based on the descriptions herein, the real quantity of positive samples and the real quantity of negative samples in each second bin can be determined. Therefore, in step S330, a second differential privacy noise is separately added based on the real quantity of positive samples and the real quantity of negative samples, to correspondingly obtain a second positive sample noise addition quantity and a second negative sample noise addition quantity.

It should be noted that the second differential privacy noise is a noise sampled by the second party based on a DP mechanism. In addition, the DP mechanism used by the second party for sampling and a DP mechanism used in response to that the first party determines the first differential privacy noise are usually the same, but can alternatively be different. In an implementation, the second differential privacy noise is a Gaussian noise, and is sampled from a Gaussian noise distribution. For example, the second party can determine a noise power based on a privacy budget parameter specified by the second party for the plurality of samples and a quantity of bins corresponding to each feature in the second feature portion held by the second party, and then determine a Gaussian noise distribution $$\mathcal{N}(0, \sigma_B^2)$$

by using the noise power as a variance of a Gaussian distribution and using 0 as an average value, to sample a Gaussian noise $z$, $$\mathcal{N}(0, \sigma_B^2),$$

from the Gaussian noise distribution. In addition, for further descriptions that the second party determines $$z \in \mathcal{N}(0, \sigma_B^2),$$

references can be made to related descriptions that the first party determines the Gaussian noise distribution $$\mathcal{N}(0, \sigma_A^2),$$

and details are omitted herein.

In addition, for a sampling quantity of the second differential privacy noise, random noise sampling can be separately performed for different objects to which a noise is to be added. In an implementation, a plurality of noises can be correspondingly sampled from a noise distribution of differential privacy for the plurality of second bins. In another implementation, for the plurality of second bins, a plurality of groups of noises can be correspondingly sampled from the noise distribution of differential privacy, and two noises in each group respectively correspond to a positive sample and a negative sample in a corresponding bin.

Based on the descriptions herein, the second differential privacy noise can be obtained through sampling, to perform noise addition processing on the real quantity of positive samples and the real quantity of negative samples. In an implementation, a second differential privacy noise corresponding to a certain second bin can be separately added based on a real quantity of positive samples and a real quantity of negative samples that correspond to the certain second bin. In other words, the same noise is added to a quantity of positive samples and a quantity of negative samples that correspond to the same bin, to obtain a corresponding second positive sample noise addition quantity and a corresponding second negative sample noise addition quantity. For example, such a noise addition process can be represented as follows:

$$\tilde{y}_{i,j} = \sum_{l_{i,k} \in \mathcal{B}_{i,j}} l_{i,k} + z_{i,j} \quad (16)$$

$$\tilde{n}_{i,j} = \sum_{l_{i,k} \in \mathcal{B}_{i,j}} \bar{l}_{i,k} + z_{i,j} \quad (17)$$

In Formula (16) and Formula (17), a subscript 'i,j' represents the $j^{th}$ bin of the $i^{th}$ feature, and corresponds to any certain second bin; $\mathcal{B}_{i,j}$ represents a sample set corresponding to the certain second bin; $\ell_{i,k} \in \mathcal{B}_{i,j}$ represents a label of a sample in the set $\mathcal{B}_{i,j}$; $z_{i,j}$ represents a differential privacy noise corresponding to the certain second bin; $\sum_{l_{i,k} \in \mathcal{B}_{i,j}} l_{i,k}$ and $\sum_{l_{i,k} \in \mathcal{B}_{i,j}} \bar{l}_{i,k}$ respectively represent a real quantity of positive samples and a real quantity of negative samples that correspond to the certain second bin; and $\tilde{y}_{i,j}$ and $\tilde{n}_{i,j}$ respectively represent a second positive sample noise addition quantity and a second negative sample noise addition quantity corresponding to the certain second bin.

In an implementation, for a real quantity of positive samples and a real quantity of negative samples that correspond to a certain second bin, one noise in corresponding group of differential privacy noises can be added to the former, and two noises in a corresponding group of noises can be added to the latter, to obtain a corresponding second positive sample noise addition quantity and a corresponding second negative sample noise addition quantity. For example, such a noise addition process can be represented as:

$$\tilde{y}_{i,j} = \sum\nolimits_{l_{i,k} \in \mathcal{B}_{i,j}} l_{i,k} + z_{i,j} \tag{18}$$

$$\tilde{n}_{i,j} = \sum\nolimits_{l_{i,k} \in \mathcal{B}_{i,j}} \bar{l}_{i,k} + z'_{i,j} \tag{19}$$

In Formula (18) and Formula (19), two different noises in a group of differential privacy noises corresponding to a certain second bin are shown by using symbols $z_{i,j}$ and $z'_{i,j}$.

Based on the descriptions herein, the second positive sample noise addition quantity $\tilde{y}_{i,j}$ and the second negative sample noise addition quantity $\tilde{n}_{i,j}$ that correspond to each second bin can be obtained. Here, $i \in \mathcal{F}_B$, and $\mathcal{F}_B$ represents the second feature portion. Based on the descriptions herein, step S340 can be performed, to determine a corresponding second noise addition index of the second bin based on the second positive sample noise addition quantity $\tilde{y}_{i,j}$ and the second negative sample noise addition quantity $\tilde{n}_{i,j}$.

It should be understood that, for descriptions of this step, references can be made to the descriptions of the first noise addition index of the first bin used to determine the first bin in step S207. The following provides only a formula for calculating the second noise addition weight of evidence for illustrative description. For other descriptions, references can be made to related descriptions in step S207.

$$\tilde{y}_i = \sum\nolimits_{j \in \mathcal{B}_i} \tilde{y}_{i,j} \tag{20}$$

$$\tilde{n}_i = \sum\nolimits_{j \in \mathcal{B}_i} \tilde{n}_{i,j} \tag{21}$$

$$\widetilde{WoE}_{i,j} = ln\left(\frac{\tilde{y}_{i,j}}{\tilde{y}_i}\right) - ln\left(\frac{\tilde{n}_{i,j}}{\tilde{n}_i}\right), \forall\, i \in \mathcal{F}_B,\, j \in \mathcal{B}_i \tag{22}$$

In Formula (20), Formula (21), and Formula (22), $\mathcal{B}$ represents a set including a plurality of second bins of the $i^{th}$ second feature; j represents the $j^{th}$ second bin in the plurality of second bins; $\tilde{y}_i$ and $\tilde{n}_i$ respectively represent a total second positive sample noise addition quantity and a total second negative sample noise addition quantity; and $\widetilde{WoE}_{i,j}$ represents a second noise addition weight of evidence corresponding to the $j^{th}$ second bin of the $i^{th}$ second feature.

Therefore, a second party that holds a label can determine a second noise addition weight of evidence $\widetilde{WoE}_{i,j}$ corresponding to any second bin by using the differential privacy mechanism. Therefore, further feature processing such as feature selection, evaluation, or coding is performed on the first feature portion and the second feature portion based on the second noise addition weight of evidence $\widetilde{WoE}_{i,j}$, $i \in \mathcal{F}_B$ and the determined first noise addition weight of evidence $\widetilde{WoE}_{i,j}$, $i \in \mathcal{F}_A$.

Figure 4:
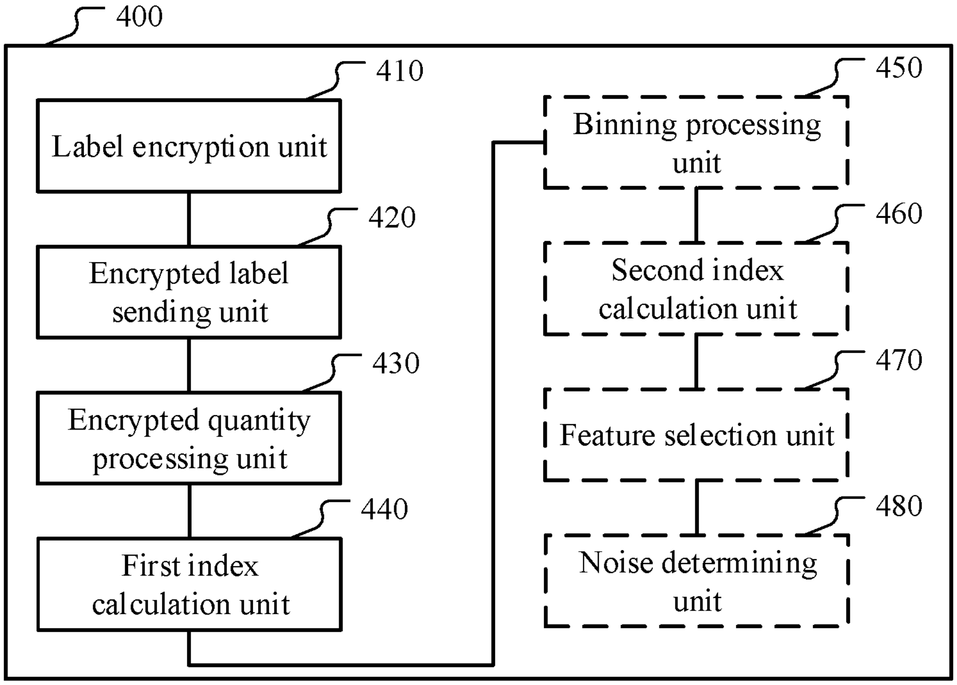
FIG. 4 is a structural diagram illustrating a differential privacy-based feature processing apparatus according to an implementation.

Corresponding to the feature processing method, an implementation of this specification further discloses a feature processing apparatus. FIG. 4 is a structural diagram illustrating a differential privacy-based feature processing apparatus according to an implementation. A participant of the Federated learning includes a first party and a second party, the first party stores a first feature portion of a plurality of samples, the second party stores a plurality of binary classification labels corresponding to the plurality of samples, and the apparatus is integrated into the second party. As shown in FIG. 4, an apparatus 400 includes:

a label encryption unit 410, configured to separately encrypt the plurality of binary classification labels corresponding to the plurality of samples, to obtain a plurality of encrypted labels; an encrypted label sending unit 420, configured to send the plurality of encrypted labels to the first party; an encrypted quantity processing unit 430, configured to: receive, from the first party, a first positive sample encrypted noise addition quantity and a first negative sample encrypted noise addition quantity corresponding to each first bin in a plurality of first bins, and decrypt the first positive sample encrypted noise addition quantity and the first negative sample encrypted noise addition quantity, to obtain a corresponding first positive sample noise addition quantity of the first bin and a corresponding first negative sample noise addition quantity of the first bin, where the first positive sample encrypted noise addition quantity and the first negative sample encrypted noise addition quantity are determined based on the plurality of encrypted labels and a first differential privacy noise, and the plurality of first bins are obtained by performing binning processing on the plurality of samples for a feature in the first feature portion; and a first index calculation unit 440, configured to determine a first noise addition index of the first bin based on the first positive sample noise addition quantity of the first bin and the first negative sample noise addition quantity of the first bin.

In an implementation, a service object of the plurality of samples is any one or more of the following: a user, a commodity, or a service event.

In an implementation, the label encryption unit 410 is, for example, configured to separately encrypt the plurality of binary classification labels based on a determined (predetermined or dynamically determined) encryption algorithm, to obtain the plurality of encrypted labels. The determined encryption algorithm satisfies the following condition: a decryption result obtained after ciphertexts are multiplied is equal to a value obtained by adding corresponding plaintexts.

In an implementation, the first index calculation unit 440 includes: a total quantity determining subunit, configured to: perform summation processing on a plurality of first positive sample noise quantities corresponding to the plurality of first bins, to obtain a total first positive sample noise addition quantity; perform summation processing on a plurality of first negative sample noise quantities corresponding to the plurality of first bins, to obtain a total first negative sample noise addition quantity; and determine the first noise addition index of the first bin based on the total first positive sample noise addition quantity, the total first negative sample noise addition quantity, the first positive sample noise addition quantity of the first bin, and the first negative sample noise addition quantity of the first bin.

In an implementation, the first noise addition index of the first bin is a first noise addition weight of evidence, and the index determining subunit is, for example, configured to: divide the first positive sample noise addition quantity of the first bin by the total first positive sample noise addition quantity, to obtain a first positive sample proportion; divide the first negative sample noise addition quantity of the first bin by the total first negative sample noise addition quantity, to obtain a first negative sample proportion; subtract a logarithm result of the first negative sample proportion from a logarithm result of the first positive sample proportion, to obtain the first noise addition weight of evidence.

In an implementation, the second party further stores a second feature portion of the plurality of samples, and the apparatus 400 further includes: a binning processing unit 450, configured to perform binning processing on the plurality of samples for a feature in the second feature portion, to obtain a plurality of second bins; a second index calculation unit 460, configured to determine a second noise addition index of each second bin in the plurality of second bins based on a differential privacy mechanism; and the apparatus 400 further includes: a feature selection unit 470, configured to perform feature selection processing on the first feature portion and the second feature portion based on the first noise addition index of the first bin and the second noise addition index.

In an implementation, the second index calculation unit 460 includes: a real quantity determining subunit, configured to determine a real quantity of positive samples and a real quantity of negative samples in each second bin based on the binary classification label; a noise addition quantity determining subunit, configured to separately add a second differential privacy noise based on the real quantity of positive samples and the real quantity of negative samples, to correspondingly obtain a second positive sample noise addition quantity and a second negative sample noise addition quantity; and a noise addition index determining subunit, configured to determine a corresponding second noise addition index of the second bin based on the second positive sample noise addition quantity and the second negative sample noise addition quantity.

In an implementation, the second differential privacy noise is a Gaussian noise, and the apparatus 400 further includes a noise determining unit 480, configured to: determine a noise power based on a privacy budget parameter set for the plurality of samples and a quantity of bins corresponding to each feature in the second feature portion; generate a Gaussian noise distribution by using the noise power as a variance of a Gaussian distribution and using 0 as an average value; and sample the Gaussian noise from the Gaussian noise distribution.

Further, in an example, that the noise determining unit 480 is configured to determine the noise power, for example, includes: determining a sum of quantities of bins corresponding to features in the second feature portion; obtaining a variable value of an average variable, where the variable value is determined based on a parameter value of the privacy budget parameter and a constraint relationship between the privacy budget parameter and the average variable in a Gaussian mechanism for differential privacy; and calculating the noise power based on a product of the following factors: the sum of the quantities of bins, and a reciprocal of a square operation performed on the variable value.

Further, in an example, the privacy budget parameter includes a budget item parameter and a relaxation item parameter.

In an implementation, the apparatus further includes a noise sampling unit, configured to correspondingly sample a plurality of groups of noises from a noise distribution of differential privacy for the plurality of second bins. That the second index calculation unit 460 is configured to separately add the differential privacy noise, for example, includes: adding a noise in a corresponding group of noises based on the real quantity of positive samples, and adding another noise in the group of noises based on the real quantity of negative samples.

In an implementation, the noise addition index determining subunit in the second index calculation unit 460 is, for example, configured to: perform summation processing on a plurality of second positive sample noise quantities corresponding to the plurality of second bins, to obtain a total second positive sample noise addition quantity; perform summation processing on a plurality of second negative sample noise quantities corresponding to the plurality of second bins, to obtain a total second negative sample noise addition quantity; and determine the second noise addition index based on the total second positive sample noise addition quantity, the total second negative sample noise addition quantity, the second positive sample noise addition quantity, and the second negative sample noise addition quantity.

Further, in an example, the second noise addition index is a second noise addition weight of evidence, and that the noise addition index determining subunit is configured to determine the second noise addition index, for example, includes: dividing the second positive sample noise addition quantity by the total second positive sample noise addition quantity, to obtain a second positive sample proportion; dividing the second negative sample noise addition quantity by the total second negative sample noise addition quantity, to obtain a second negative sample proportion; and subtracting a logarithm result of the second negative sample proportion from a logarithm result of the second positive sample proportion, to obtain the second noise addition weight of evidence.

Figure 5:
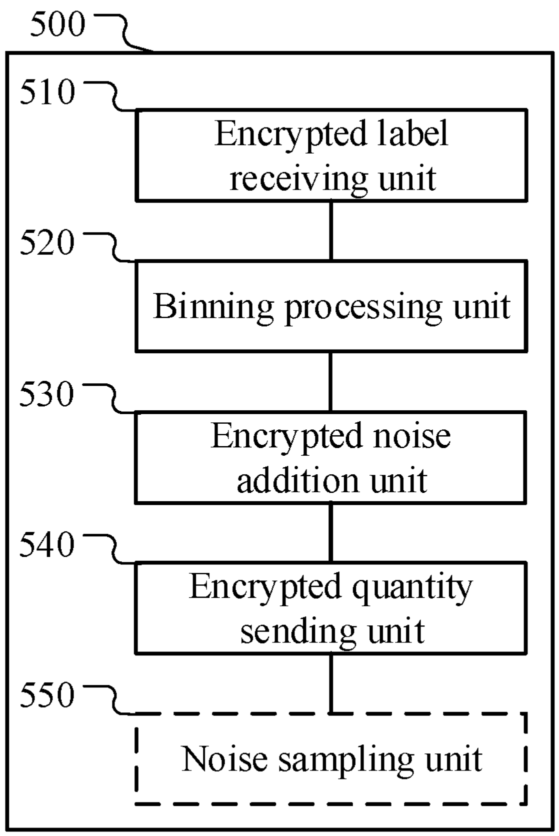
FIG. 5 is a structural diagram illustrating a differential privacy-based feature processing apparatus according to an implementation.

FIG. 5 is a structural diagram illustrating a differential privacy-based feature processing apparatus according to another implementation. A participant of the Federated learning includes a first party and a second party, the first party stores a first feature portion of a plurality of samples, the second party stores a second feature portion and a plurality of binary classification labels corresponding to the plurality of samples, and the apparatus is integrated into the first party. As shown in FIG. 5, an apparatus 500 includes:

- an encrypted label receiving unit 510, configured to receive a plurality of encrypted labels from the second party, where the plurality of encrypted labels are obtained by separately encrypting the plurality of binary classification labels corresponding to the plurality of samples; a binning processing unit 520, configured to perform binning processing on the plurality of samples for a feature in the first feature portion, to obtain a plurality of first bins; an encrypted noise addition unit 530, configured to determine, based on the plurality of encrypted labels and a differential privacy noise, a first positive sample encrypted noise addition quantity and a first negative sample encrypted noise addition quantity corresponding to each first bin; and an encrypted quantity sending unit 540, configured to send the first positive sample encrypted noise addition quantity and the first negative sample encrypted noise addition quantity to the second party, for the second party to decrypt the first positive sample encrypted noise addition quantity and the first negative sample encrypted noise addition quantity to obtain a first positive sample noise addition quantity of the first bin and a first negative sample noise addition quantity of the first bin, and to determine a first noise addition index of the first bin based on the first positive sample noise addition quantity and the first negative sample noise addition quantity.

In an implementation, a service object of the plurality of samples is any one or more of the following: a user, a commodity, or a service event.

In an implementation, the encrypted noise addition unit 530 is, for example, configured to: determine, for each first bin, a continued multiplication result between encrypted labels corresponding to all samples in the first bin; perform product processing on the continued multiplication result and an encrypted noise obtained by encrypting the differential privacy noise, to obtain the first positive sample encrypted noise addition quantity; and subtract the first positive sample encrypted noise addition quantity from an encrypted total quantity obtained by encrypting a total quantity of samples in the first bin, to obtain the first negative sample encrypted noise addition quantity.

In an implementation, the apparatus 500 further includes a noise sampling unit 550, configured to correspondingly sample a plurality of noises from a noise distribution of differential privacy for the plurality of first bins. That the encrypted noise addition unit 530 is configured to perform product processing, for example, includes: encrypting a noise corresponding to the continued multiplication result in the plurality of noises, to obtain the encrypted noise; and performing product processing on the continued multiplication result and the encrypted noise.

In an implementation, the differential privacy noise is a Gaussian noise, and the apparatus 500 further includes a noise determining unit 550, configured to determine a noise power based on a privacy budget parameter set for the plurality of samples and a quantity of bins corresponding to each feature in the first feature portion; generate a Gaussian noise distribution by using the noise power as a variance of a Gaussian distribution and using 0 as an average value; and sample the Gaussian noise from the Gaussian noise distribution.

In an implementation, that the noise determining unit 500 is configured to determine the noise power, for example, includes: determining a sum of quantities of bins corresponding to features in the second feature portion; obtaining a variable value of an average variable, where the variable value is determined based on a parameter value of the privacy budget parameter and a constraint relationship between the privacy budget parameter and the average variable in a Gaussian mechanism for differential privacy; and calculating the noise power based on a product of the following factors: the sum of the quantities of bins, and a reciprocal of a square operation performed on the variable value.

In an example, the privacy budget parameter includes a budget item parameter and a relaxation item parameter.

According to an implementation of another aspect, a computer-readable storage medium is further provided. The computer-readable storage medium stores a computer program. When the computer program is executed in a computer, the computer is enabled to perform the method described with reference to FIG. 2 or FIG. 3.

According to an implementation of still another aspect, a computing device is further provided, and includes a memory and a processor. The memory stores executable code, and in response to that the processor executes the executable code, the method described with reference to FIG. 2 or FIG. 3 is implemented.

A person skilled in the art should be aware that, in the above-mentioned one or more examples, functions described in the present invention can be implemented by hardware, software, firmware, or any combination thereof. When software is used for implementation, these functions can be stored in a computer-readable medium or transmitted as one or more instructions or code on the computer-readable medium.

The objectives, technical solutions, and beneficial effects of the present invention are further described in detail in the above implementations. It should be understood that the above descriptions are merely implementations of the present invention, but are not intended to limit the protection scope of the present invention. Any modification, equivalent replacement, or improvement made based on the technical solutions of the present invention shall fall within the protection scope of the present invention.

What is claimed is:

1. A method, comprising:

separately encrypting a plurality of binary classification labels to obtain a plurality of encrypted labels, the plurality of binary classification labels corresponding to a plurality of samples, a first feature portion of the plurality of samples being stored in a first party, the plurality of binary classification labels being stored in a second party;

sending the plurality of encrypted labels to the first party;

receiving, from the first party, a first positive sample encrypted noise addition quantity and a first negative sample encrypted noise addition quantity corresponding to each first bin in a plurality of first bins, and decrypting the first positive sample encrypted noise addition quantity and the first negative sample encrypted noise addition quantity, to obtain a corresponding first positive sample noise addition quantity of the first bin and a corresponding first negative sample noise addition quantity of the first bin; and determining a first noise addition index of the first bin based on the first positive sample noise addition quantity of the first bin and the first negative sample noise addition quantity of the first bin.

2. The method according to claim 1, wherein a service object of the plurality of samples is one or more of: a user, a commodity, or a service event.

3. The method according to claim 1, wherein the separately encrypting the plurality of binary classification labels to obtain the plurality of encrypted labels comprises:

separately encrypting the plurality of binary classification labels based on a homomorphic encryption algorithm to obtain the plurality of encrypted labels.

4. The method according to claim 1, wherein the determining the first noise addition index of the first bin based on the first positive sample noise addition quantity of the first bin and the first negative sample noise addition quantity of the first bin comprises:

performing summation processing on a plurality of first positive sample noise quantities corresponding to the plurality of first bins to obtain a total first positive sample noise addition quantity;

performing summation processing on a plurality of first negative sample noise quantities corresponding to the plurality of first bins to obtain a total first negative sample noise addition quantity; and determining the first noise addition index of the first bin based on the total first positive sample noise addition quantity, the total first negative sample noise addition quantity, the first positive sample noise addition quantity of the first bin, and the first negative sample noise addition quantity of the first bin.

5. The method according to claim 4, wherein the first noise addition index of the first bin is a first noise addition weight of evidence, and the determining the first noise addition index of the first bin comprises:

dividing the first positive sample noise addition quantity of the first bin by the total first positive sample noise addition quantity to obtain a first positive sample proportion;

dividing the first negative sample noise addition quantity of the first bin by the total first negative sample noise addition quantity to obtain a first negative sample proportion; and subtracting a logarithm result of the first negative sample proportion from a logarithm result of the first positive sample proportion to obtain the first noise addition weight of evidence.

6. The method according to claim 1, wherein the second party further stores a second feature portion of the plurality of samples, and the method further comprises:

performing binning processing on the plurality of samples for a feature in the second feature portion, to obtain a plurality of second bins;

determining a second noise addition index of each second bin in the plurality of second bins based on a differential privacy mechanism; and after the determining the first noise addition index of the first bin, performing feature selection processing on one or more of the first feature portion or the second feature portion based on the first noise addition index of the first bin or the second noise addition index.

7. The method according to claim 6, wherein the determining the second noise addition index of each second bin in the plurality of second bins based on a differential privacy mechanism comprises:

determining a quantity of positive samples and a quantity of negative samples in each second bin based on the binary classification label;

separately adding a second differential privacy noise based on the quantity of positive samples and the quantity of negative samples, to correspondingly obtain a second positive sample noise addition quantity and a second negative sample noise addition quantity; and determining a corresponding second noise addition index of the second bin based on the second positive sample noise addition quantity and the second negative sample noise addition quantity.

8. The method according to claim 7, wherein the second differential privacy noise is a Gaussian noise, and before the separately adding the second differential privacy noise, the method further comprises:

determining a noise power based on a privacy budget parameter set for the plurality of samples and a quantity of bins corresponding to each feature in the second feature portion;

generating a Gaussian noise distribution by using the noise power as a variance of a Gaussian distribution and using 0 as an average value; and sampling the Gaussian noise from the Gaussian noise distribution.

9. The method according to claim 8, wherein the determining the noise power comprises:

determining a sum of quantities of bins corresponding to features in the second feature portion;

obtaining a variable value of an average variable, the variable value being determined based on a parameter value of the privacy budget parameter and a constraint relationship between the privacy budget parameter and the average variable in a Gaussian mechanism for differential privacy; and calculating the noise power based on a product of following factors: the sum of the quantities of bins, and a reciprocal of a square operation performed on the variable value.

10. The method according to claim 9, wherein the privacy budget parameter comprises a budget item parameter and a relaxation item parameter.

11. The method according to claim 7, wherein before the separately adding the second differential privacy noise, the method further comprises:

correspondingly sampling a plurality of groups of noises from a noise distribution of differential privacy for the plurality of second bins; and the separately adding the second differential privacy noise includes:

adding a noise in a corresponding group of noises based on the quantity of positive samples, and adding another noise in the group of noises based on the quantity of negative samples.

12. The method according to claim 7, wherein the determining the corresponding second noise addition index of the second bin based on the second positive sample noise addition quantity and the second negative sample noise addition quantity comprises:

performing summation processing on a plurality of second positive sample noise quantities corresponding to the plurality of second bins, to obtain a total second positive sample noise addition quantity;

performing summation processing on a plurality of second negative sample noise quantities corresponding to the plurality of second bins, to obtain a total second negative sample noise addition quantity; and determining the second noise addition index based on the total second positive sample noise addition quantity, the total second negative sample noise addition quantity, the second positive sample noise addition quantity of the second bin, and the second negative sample noise addition quantity of the second bin.

13. The method according to claim 12, wherein the second noise addition index is a second noise addition weight of evidence, and the determining the second noise addition index comprises:

dividing the second positive sample noise addition quantity by the total second positive sample noise addition quantity, to obtain a second positive sample proportion;

dividing the second negative sample noise addition quantity by the total second negative sample noise addition quantity, to obtain a second negative sample proportion; and subtracting a logarithm result of the second negative sample proportion from a logarithm result of the second positive sample proportion, to obtain the second noise addition weight of evidence.

14. The method according to claim 1, comprising:

receiving, by the first party, the plurality of encrypted labels from the second party;

performing binning processing on the plurality of samples for a feature in the first feature portion to obtain a plurality of first bins;

determining, based on the plurality of encrypted labels and a differential privacy noise, the first positive sample encrypted noise addition quantity and the first negative sample encrypted noise addition quantity corresponding to each first bin; and sending the first positive sample encrypted noise addition quantity and the first negative sample encrypted noise addition quantity to the second party.

15. The method according to claim 14, wherein the determining, based on the plurality of encrypted labels and the differential privacy noise, the first positive sample encrypted noise addition quantity and the first negative sample encrypted noise addition quantity corresponding to each first bin comprises:

determining, for each first bin, a continued multiplication result between encrypted labels corresponding to all samples in the first bin;

performing product processing on the continued multiplication result and an encrypted noise obtained by encrypting the differential privacy noise, to obtain the first positive sample encrypted noise addition quantity; and subtracting the first positive sample encrypted noise addition quantity from an encrypted total quantity obtained by encrypting a total quantity of samples in the first bin, to obtain the first negative sample encrypted noise addition quantity.

16. The method according to claim 15, wherein before the performing product processing on the continued multiplication result and the encrypted noise obtained by encrypting the differential privacy noise, the method further comprises:

correspondingly sampling a plurality of noises from a noise distribution of differential privacy for the plurality of first bins; and the performing product processing on the continued multiplication result and the encrypted noise obtained by encrypting the differential privacy noise includes:

encrypting a noise corresponding to the continued multiplication result in the plurality of noises to obtain the encrypted noise; and performing product processing on the continued multiplication result and the encrypted noise.

17. The method according to claim 14, wherein the differential privacy noise is a Gaussian noise, and before the determining, based on the plurality of encrypted labels and the differential privacy noise, the first positive sample encrypted noise addition quantity and the first negative sample encrypted noise addition quantity corresponding to each first bin, the method further comprises:

determining a noise power based on a privacy budget parameter set for the plurality of samples and a quantity of bins corresponding to each feature in the first feature portion;

generating a Gaussian noise distribution by using the noise power as a variance of a Gaussian distribution and using 0 as an average value; and sampling the Gaussian noise from the Gaussian noise distribution.

18. The method according to claim 17, wherein the determining the noise power comprises:

determining a sum of quantities of bins corresponding to features in the first feature portion;

obtaining a variable value of an average variable, the variable value being determined based on a parameter value of the privacy budget parameter and a constraint relationship between the privacy budget parameter and the average variable in a Gaussian mechanism for differential privacy; and calculating the noise power based on a product of following factors: a sum of the quantities of bins, and a reciprocal of a square operation performed on the variable value.

19. A computer system having one or more processors and one or more storage devices, the one or more storage devices, individually or collectively, having computer executable instructions stored thereon, the computer executable instructions, when executed by the one or more processors, enabling the one or more processors to, individually or collectively, implement acts comprising:

separately encrypting a plurality of binary classification labels to obtain a plurality of encrypted labels, the plurality of binary classification labels corresponding to a plurality of samples, a first feature portion of the plurality of samples being stored in a first party, the plurality of binary classification labels being stored in a second party;

sending the plurality of encrypted labels to the first party;

receiving, from the first party, a first positive sample encrypted noise addition quantity and a first negative sample encrypted noise addition quantity corresponding to each first bin in a plurality of first bins, and decrypting the first positive sample encrypted noise addition quantity and the first negative sample encrypted noise addition quantity, to obtain a corresponding first positive sample noise addition quantity of the first bin and a corresponding first negative sample noise addition quantity of the first bin; and determining a first noise addition index of the first bin based on the first positive sample noise addition quantity of the first bin and the first negative sample noise addition quantity of the first bin.

20. A non-transitory storage medium having computer executable instructions stored thereon, the computer executable instructions, when executed by one or more processors, enabling the one or more processors to, individually or collectively, implement acts comprising:

separately encrypting a plurality of binary classification labels to obtain a plurality of encrypted labels, the plurality of binary classification labels corresponding to a plurality of samples, a first feature portion of the plurality of samples being stored in a first party, the plurality of binary classification labels being stored in a second party;

sending the plurality of encrypted labels to the first party;

receiving, from the first party, a first positive sample encrypted noise addition quantity and a first negative sample encrypted noise addition quantity corresponding to each first bin in a plurality of first bins, and decrypting the first positive sample encrypted noise addition quantity and the first negative sample encrypted noise addition quantity, to obtain a corresponding first positive sample noise addition quantity of the first bin and a corresponding first negative sample noise addition quantity of the first bin; and determining a first noise addition index of the first bin based on the first positive sample noise addition quantity of the first bin and the first negative sample noise addition quantity of the first bin.

* * * * *